Sept. 4, 1962  G. M. WOLFF  3,052,746

INSULATING HOSE PROTECTIVE DEVICE

Filed May 29, 1961

INVENTOR:
GEORGE M. WOLFF,
BY *William C. Crutcher*
HIS ATTORNEY.

3,052,746
INSULATING HOSE PROTECTIVE DEVICE
George M. Wolff, Scotia, N.Y., assignor to General Electric Company, a corporation of New York
Filed May 29, 1961, Ser. No. 113,247
6 Claims. (Cl. 174—8)

This invention relates to an improved arrangement for protecting an insulating hose used to supply liquid coolant to a high-voltage electrical conductor, and more particularly to a device for preventing damage to the hose of a liquid-cooled dynamoelectric machine.

There are occasions where it becomes desirable to directly cool the conductive portions of a high-voltage insulated member. In the armature bar of a large liquid-cooled generator where the voltage above ground potential is of the order of several kilovolts, the liquid coolant may be supplied to and discharged from cooling passages in the armature bar by means of insulated hose assemblies connecting the conductive portions of the armature bar with the grounded liquid manifold supply pipes. Even though the liquid coolant is selected to have good dielectric qualities, for example, very pure deionized water, nevertheless there may still be an unavoidable slight leakage current through both the liquid column and through the insulated hose assembly containing the liquid column, due to very high voltages employed in such machines.

Those familiar with liquid-cooled dynamoelectric machines will understand that liquid is generally introduced to the end turns of the windings at various locations around the stator circumference. For this reason, there are certain locations, particularly near the lower portion of the stator circumference, where the liquid supply fitting connected to the high-voltage winding is disposed higher than the insulated hose assembly, and where, due to the configuration of the armature bars, there is the possibility of an entrapment or "bubble" of gas. Such a bubble may come about by various phenomena not material to the present invention, such as permeation of hydrogen in a hydrogen-filled machine, or such as a very small leak in the lower regions of the insulated hose assembly for example, during periods when the liquid is not flowing. If the bubble is of such a size that the liquid level of the coolant is separated from the electrically-conductive portion, a large portion of the total voltage drop to ground will be imposed across the inner surface of the insulating hose assembly alone, and arcing can occur which might damage the insulation and even lead to a hole in the hose.

Accordingly, the object of the present invention is to provide a protective device for reducing the possibility of damage to an insulated hose supplying a high-voltage electrical conductor with cooling liquid.

The subject matter of the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

Briefly stated, the invention is practiced by adding an electrically conductive projection to the conducting portion of the hose assembly. This projection extends into the insulating portion of the hose assembly for such a distance that when contact with the projection is broken through a lowering of the liquid level, the voltage-distance relationship along the inner surface of the insulating hose will be such that a damage-producing arc along this inner wall will not take place.

Figure 1:
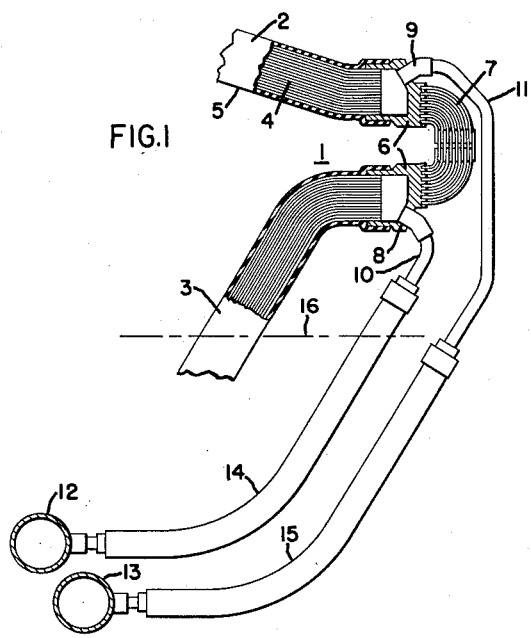
FIG. 1 is a simplified view, partly in section, of an armature bar end turn supplied with liquid coolant through insulated hose assemblies.

Referring now to FIG. 1 of the drawing, an armature bar end turn portion shown generally as 1 comprises the terminations of coil-halves 2, 3. Each armature bar or coil half comprises strands 4, some of which may be hollow to carry the liquid coolant. Strands 4 are surrounded by heavy insulation 5, and are at an A.C. potential above ground of several kilovolts, perhaps 15 kv. Strands 4 are brazed to liquid fittings 6 electrically connected by a "series loop" 7.

Fittings 6 also provide chambers leading to the internal cooling passages in strands 2 and have inlet and outlet pipe fittings, 8, 9, respectively, communicating with these chambers and providing a means for connecting metal pipes 10, 11, respectively, to fittings 6.

Pipes 10, 11 are of an electrically conductive material, such as stainless steel, and serve to supply liquid coolant to the high-voltage armature bars and to discharge spent coolant from the armature bars. Pipes 10, 11 are at the same voltage as strands 4.

End turns 1 are disposed all about the circumference of the generator stator at various angles. In order to conveniently supply and discharge liquid to turns 1, annular manifolds comprising inlet manifold 12 and outlet manifold 13 extend around the stator end turns. These are generally attached to the stator frame and are at ground potential. Hence, a substantial voltage exists between manifolds 12, 13 and metal pipes 10, 11.

Hydraulically connected, so as to carry liquid between manifolds 12, 13 and pipes 10, 11 are hose assemblies 14, 15 respectively. Hoses 14, 15 are constructed of insulating material and are made to exacting standards to provide reduced permeation of gas through the hose into the liquid, resistance to collapse from external pressure, high burst strength, adequate flexibility, and long-time resistance to heat. A suitable hose assembly for such an application is disclosed in the copending application Serial No. 74,131 filed in the names of G. M. Wolff and Frank J. Lasak on December 6, 1960. A very good material for the inner tube of such a hose assembly, which is exposed both to the metal pipes and the liquid coolant, is polytetrafluoroethylene, manufactured by E. I. du Pont de Nemours & Co. under the trademark "Teflon."

Due to the varying configurations of the end turns, there is the possibility that gas may be entrapped in portions of the cooling system. This in indicated in FIG. 1 by a dot-dash line 16 indicating the liquid level, and also indicating that, for some reason, gas has become entrapped in the ducts of armature bar 3 at the end thereof, metal pipe 10, and in a portion of insulating hose 14. The invention is concerned with the protection of hose 14 in the area where it joins tube 10 and will be better illustrated by reference to the diagrammatic views of FIGURES 2 through 4.

Figure 2:
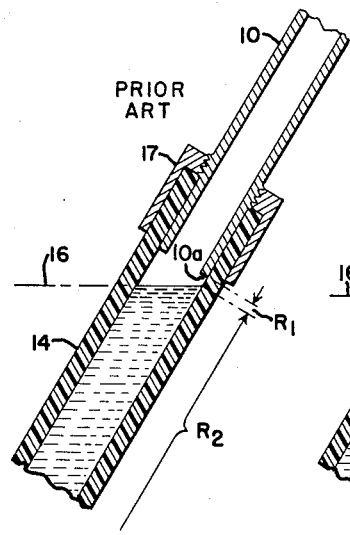
FIG. 2 is a diagrammatic view, in section, of the junction between hose conducting and insulating portions, illustrating the problems of the prior art.

FIG. 2, illustrating the prior art arrangement, shows a conductive metal pipe 10 extending inside an insulated hose assembly 14 and attached thereto by a metal ferrule 17. Hose 14 is shown as a single layer of insulating material, although it is understood that it might be a composite multilayer hose assembly. The conductive pipe 10 forms a junction with insulating hose 14 along a line 10a. The liquid level 16 is shown just below the junction 10a.

It will be appreciated that where the liquid level is such as shown in FIG. 2, the electrical resistance along which leakage currents can take place between metal pipe 10 and grounded liquid manifold pipe 12 consists of the surface resistance $R_1$ along the inside of tube 14 between liquid level 16 and junction 10a in series with the resistance $R_2$ of the column of liquid. Even though the liquid is selected to have very good dielectric characteristics, it can still be significantly more conductive than the material of the hose 14. Therefore, since the potential of several kilovolts is imposed across the resistances $R_1$ and $R_2$ in series, and since the resistance across $R_1$ can be appreciably greater than the resistance across $R_2$, due to the greater resistivity of the insulating hose material, the resistances $R_1$, $R_2$ act as a voltage divider and the greater part of the total voltage drop is across resistance $R_1$. If the voltage distance relationship across $R_1$ between junction 10a and the liquid is too great, i.e., a very high voltage for a very small gap, arcing can occur along the wall of tube 14 between the liquid and the pipe. The heat of the arc can cause appreciable damage to the wall of tube 14 in the vicinity of the arc, and even puncture the wall.

Figure 3:
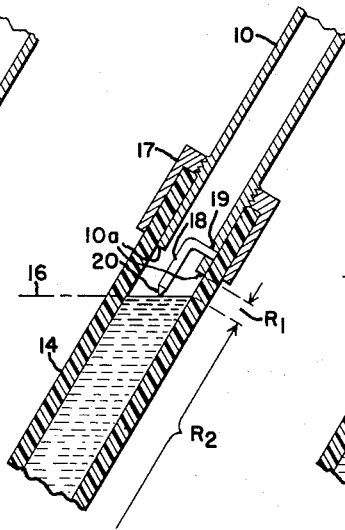
FIG. 3 is a view similar to FIG. 2, but employing the invention in one form.
Figure 4:
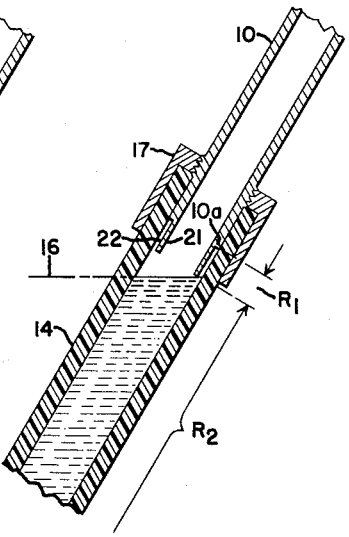
FIG. 4 is a view similar to FIG. 2, but illustrating another modification of the invention.

The protective device for reducing the possibility of such an occurrence is illustrated in FIG. 3 and in a modified form in FIG. 4. The same reference numerals are used in FIGURES 3 and 4 as were employed in FIG. 2, with the exception of the new elements.

In FIG. 3, an electrically conductive projection is attached to the wall of pipe 10, and the projection extends along the centerline of the insulated hose 14 for a distance which is dependent upon several parameters such as materials used, the voltages employed, type of liquid, anticipated gas pressure, etc. The projection in FIG. 3 consists of a metal rod 18 bent at a right angle and having its upper end electrically connected to pipe 10, as by brazing the rod in a hole 19. The end of rod 18 is pointed, as shown in 20, in order to cause the point where the rod 18 loses contact with the liquid to be as near the tube centerline as possible.

The length that rod 18 extends beyond the junction 10a of pipe 10 with tube 14 is selected by the following criteria. Resistance $R_1$, of course, depends upon the material of tube 14 and the condition of the interior wall. Resistance $R_2$ depends upon the length of the liquid column and the liquid employed. The minimum distance at which arcing between the liquid and the pipe 10 takes place depends upon the voltage across resistance $R_1$, the length of the gap, and upon the ionization potential of the gas trapped above liquid level 16 at the prevailing gas pressure. Rod 18 is caused to project into insulating tube 14 for a sufficient distance that when rod 18 breaks contact with the liquid, the voltage distance relationship between the level of the liquid and the junction 10a along the interior wall of tube 14 will be such that arcing cannot be reasonably expected to take place along the wall of the tube. Naturally added length on the rod 18 costs very little and adds substantially to the safety margin.

Reference to FIG. 4 will show a modification of the invention. There, instead of providing a rod projecting down the centerline of the tube, the projection comprises a reduced diameter section 21 of the pipe 10 which is radially separated from the walls of tube 14 by a space 22. When the liquid loses contact with the end of reduced diameter portion 21, the leakage current resistance comprises resistance $R_1$ along the insulating tube 14 in series with $R_2$, which is substantially the resistance of the liquid column. The length of reduced diameter portion 21 is selected by the same criteria as before so that arcing would not be expected to take place across $R_1$.

The modification of FIG. 4 may be satisfactory in some instances since it is somewhat easier to manufacture. The best utilization of space inside the hose 14 can be had, however, with a projection on the tube centerline as illustrated in FIG. 3.

The operation and advantages of the protective device should be apparent from the foregoing description. With the prior art arrangement, entrapment of gas which lowered the liquid level beyond the end of the high-voltage metal pipe could cause arcing along the inside surface of the insulating hose. This arcing could result in serious damage to the hose. With the invention, the projecting conductive portion, extending down the tube centerline in FIG. 3 or comprising the axially extending cylindrical portion in FIG. 4, causes the contact between the liquid column and the metal pipe to be broken, after the liquid column level is separated a substantial distance from the junction 10a where the pipe makes contact with the hose. The length of the projection is selected so that the voltage-distance relationship between the liquid and the end of the pipe is sufficient to make arcing along the interior surface of tube 14 unlikely. Although there is the possibility of arcing between rod 18 and the liquid in FIG. 3, or between the projection 21 and the liquid in FIG. 4, the location of the spark is not such as to cause any damage to the relatively vulnerable insulating material of hose 14. Since the projection is radially spaced from the wall, it effectively serves as a protective device to prevent damage to the insulating wall.

While there have been described two modifications of the invention, other arrangements will occur to those skilled in the art, and it is intended to cover in the appended claims all such modifications as fall within the true spirit and scope of the invention.

What I claim as new and desire to secure by Letters Patent of the United States is:

1. In a liquid cooling system for a high-voltage electrical conductor, the combination of a hose assembly of insulating material partially filled with liquid, an electrically conductive pipe hydraulically connected to the end of said hose assemby, and forming a pipe-hose junction therewith exposed to the liquid when the hose assembly is full, said pipe being also electrically connected to a source of high voltage, and projection means electrically connected to said pipe and inwardly spaced from the wall of the hose assembly and extending thereinto, such as to touch the liquid in the hose assembly at a sufficient axial distance from said pipe-hose junction that any arcing will take place between the projection means and the liquid rather than between the liquid and the pipe at the pipe-hose junction.

2. The combination according to claim 1, wherein said projection means comprises a rod attached to said pipe and extending substantially along the centerline of said hose assembly.

3. The combination according to claim 1, wherein said projection means comprises a reduced diameter portion at the end of said pipe.

4. In a liquid-cooled dynamoelectric machine, the combination of a liquid-cooled armature bar end turn portion electrically connected to a source of high voltage and having liquid cooling conduits therein, and also including at least one electrically conductive pipe furnishing liquid to cool the armature bar, first conduit means at ground potential containing a source of liquid coolant under pressure, an insulating hose assembly hydraulically connected between said first conduit means and said pipe, and forming a pipe-hose junction therewith, and projection means electrically connected to said pipe and inwardly spaced from the wall of the hose assembly, and extending thereinto so as to make contact with the liquid in the hose assembly at a sufficient axial distance from the pipe-hose junction that any arcing will take place between the projection means and the liquid rather than between the liquid and the pipe at the pipe-hose junction.

5. Combination according to claim 4, wherein said projection means comprises a rod attached to said pipe and extending substantially along the centerline of said hose assembly.

6. A combination according to claim 4, wherein said projection means comprises a reduced diameter portion at the end of said pipe.

References Cited in the file of this patent
UNITED STATES PATENTS

| | | |
|---|---|---|
| 2,253,264 | Burleson | Aug. 19, 1941 |
| 2,899,482 | Stevens | Aug. 11, 1959 |